Aug. 20, 1940.   M. PLANITZ   2,212,212
ARM SUPPORT FOR FISHING RODS
Filed July 25, 1938
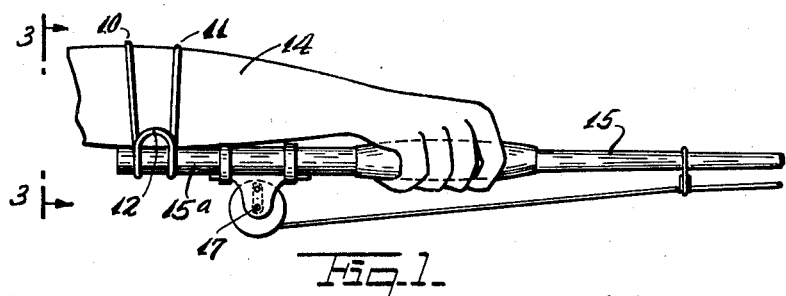
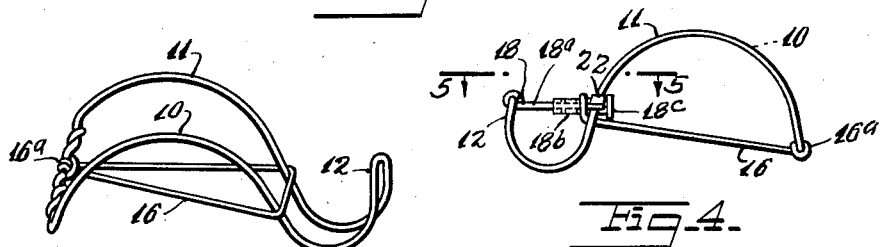
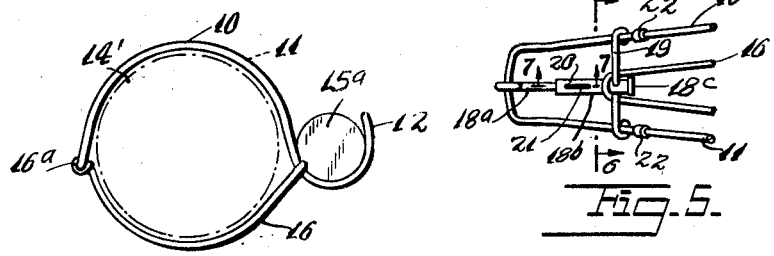
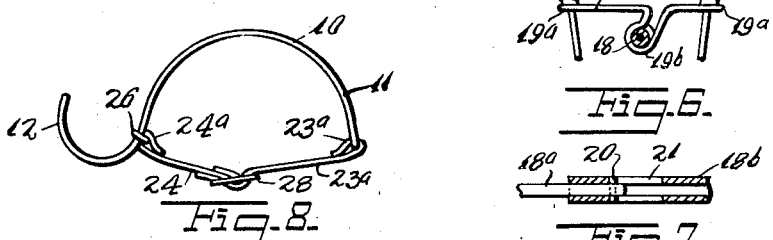
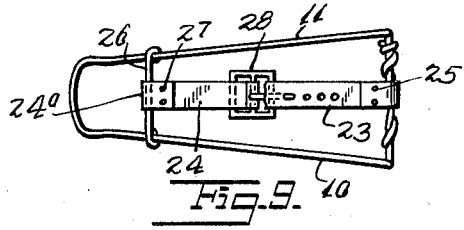
INVENTOR
*Morton Planitz*
BY
ATTORNEY

Patented Aug. 20, 1940

2,212,212

UNITED STATES PATENT OFFICE

2,212,212

ARM SUPPORT FOR FISHING RODS

Morton Planitz, Bronx, N. Y.

Application July 25, 1938, Serial No. 221,140

4 Claims. (Cl. 224—5)

This invention relates to new and useful improvements in an arm support for a fishing rod or pole.

The invention has for an object the construction of a body member which may be mounted upon one's arm in various positions to suit one's individual tastes, and which is provided with a hook portion adapted to assist in holding the inner end of a fishing pole.

Still further the invention contemplates constructing the body member of a strand of wire curved to conform with the curvature of one's arm so as to be readily engaged thereon transversely of the arm in a manner so that the hook portion is capable of supporting the end of the fishing pole in a position substantially parallel with the arm.

Still further the invention proposes a novel means for releasably securing said member on one's arm.

As another object of this invention it is proposed to characterize the securing means by an elastic strand capable of conforming with one's arm and capable of securely holding the body member in position.

Still further the invention contemplates the use of a latch for assisting in securely holding the end of the fishing pole upon the hook portion.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a support arm constructed according to this invention and shown applied schematically on one's arm in a manner to support the inner end of a fishing pole.

Fig. 2 is a perspective view of the arm support per se.

Fig. 3 is an elevational view looking in the direction of the line 3—3 of Fig. 1.

Fig. 4 is a side elevational view of an arm support constructed according to a modification of this invention.

Fig. 5 is a fragmentary horizontal sectional view taken on the line 5—5 of Fig. 4.

Fig. 6 is a fragmentary sectional view on the line 6—6 of Fig. 5.

Fig. 7 is a fragmentary sectional view on the line 7—7 of Fig. 5.

Fig. 8 is a side elevational view of an arm support constructed according to a still further embodiment of this invention.

Fig. 9 is a bottom view of Fig. 8.

The arm support for a fishing pole, according to this invention, includes a curved body member adapted to engage transversely across one's arm and consisting, essentially, of a strand of wire shaped to have a pair of substantially parallel side arms 10 and 11. At one end this body member is formed with a hook portion 12 comprising a joining portion continuing from the ends of the side arms 10 and 11. This joining portion is arranged to be directed upwards relative to the side arms and so forms a hook portion. At the other ends the side arms 10 and 11 are joined together by having their end portions twisted together, see particularly Fig. 2.

The side arms 10 and 11 are curved so as to be capable of engaging transversely across one's arm, indicated schematically in Fig. 1 by an illustration referred to by reference numeral 14. The arm and hand illustrated, is shown supporting a fishing pole 15. The inner end 15ᵃ of this fishing pole is shown engaged in the hook portion 12. The curved body member is releasably secured upon one's arm by an elastic strand 16. This elastic strand is doubled upon itself and has its ends 16ᵃ tied upon the connected ends of the side arms 10 and 11. The doubled strand has its looped end engaged over the hook 12 and so is capable of maintaining the body member on one's arm, in this respect see particularly Fig. 3. In this latter figure the dot and dash lines 14' schematically illustrate one's arm. It should be noticed that the body member engages over the arm while the elastic strand 16 is engaged beneath the arm. These parts therefore encircle the arm and maintain their positions.

The fishing pole 15 is shown provided with a conventional reel and line 17. The free hand (not shown on the drawing) may be used to operate the reel and the fishing line.

In Figs. 4-7 inclusive a modification of the invention has been disclosed which distinguishes from the prior form in the fact that a latch is provided for assisting in holding the fishing pole within the hook of the body member. The latch includes a bolt member 18 pivotally mounted upon the hook portion 12 and adapted to engage a keeper member 19 mounted across the side arms 10 and 11. This keeper member 19 is formed from a strand of wire which has its ends 19ᵃ curled around the side arms 10 and 11. Intermediate of its ends this strand of wire is formed into a loop portion 19b into which the keeper 18 is adapted to engage. This loop portion 19b is arranged so that once the keeper is forced into position therein it automatically maintains its position and may be disengaged only by being manually forced outwards.

The bolt member 18 is formed from a pair of telescopical sections 18a and 18b relatively limited in their motion by a pin 20 on one of the sections engaging slots 21 in the other of the sections. The extremity of the bolt member 18 is provided with a head 18c. The bolt member 18 may be extended or retracted to engage the keeper member 19 which may be moved upwards or downwards on the side arms 10 and 11 as required. Thus it is possible to tightly engage the bolt member 18 against the top of a fishing pole which is placed across the hook portion 12.

Friction washers 22 are mounted on the side arms 10 and 11 and are adapted to engage across the top faces of the looped ends 19a to hold the keeper member 19 from moving upwards. The construction permits the keeper member to move downwards; then the friction washers 22 may be similarly moved and serve to hold the keeper member in its down position. The elastic strand 16 is arranged to assist in holding the bolt member 18 within the loop portion 19b of the keeper member. This is accomplished by looping the looped end of the elastic strand 16 over the bolt member, as shown in Figs. 4 and 5. The elasticity of the elastic strand 16 pulls downwards and assists in holding the bolt member within the looped portion 19b of the keeper member.

In Figs. 8 and 9 another embodiment of the invention has been disclosed which distinguishes from the prior form in the means for attaching the body member upon one's arm. According to this form of the invention a leather or similar strap is used for this purpose. This strap comprises a strap section 23 cooperative with a strap section 24. The strap section 23 is secured at one of its ends by a loop portion 23a and rivets 25 to the joining ends of the side members 10 and 11.

The strap 24 has a loop portion 24a at one of its ends engaged over a support rung 26 mounted on the side arms 10 and 11. This rung comprises merely a strand of wire having its ends twisted around the side arms. Rivets 27 engage the loop portion 24a for maintaining the position of the strap. A buckle 28 is mounted upon one of the free ends of one of the strap sections and is cooperative in a conventional manner with the free end of the other section for adjustably connecting the strap sections together.

The support arm may be engaged on one's arm by opening the strap sections 23, 24, placing the body member across the arm, and then connecting the strap sections together in proper tight position to maintain the support arm in place.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an arm support for a fishing pole, a curved body member adapted to engage transversely across one's arm and having a hook portion at one end for receiving and supporting a fishing pole, and a latch for holding said fishing pole in position in said hook, said hook portion comprising a U-shaped length of wire bent to form a hook and having its arms continuing into said body member, said latch, comprising a bolt member pivotally mounted on the intermediate arm of said U-shaped hook portion and extendable transversely across the open side of said hook portion and over said fishing pole, and a keeper member extended between the side arms of said U-shaped hook portion and opposed to said intermediate arm to receive the end of said bolt member when extended across said hook portion for holding said fishing pole in position.

2. In an arm support for a fishing pole, a curved body member adapted to engage transversely across one's arm and having a hook portion at one end for receiving and supporting a fishing pole, and a latch for holding said fishing pole in position in said hook, said hook portion comprising a U-shaped length of wire bent to form a hook and having its arms continuing into said body member, said latch, comprising a bolt member pivotally mounted on the intermediate arm of said U-shaped hook portion and extendable transversely across the open side of said hook portion and over said fishing pole, and a keeper member extended between the side arms of said U-shaped hook portion and opposed to said intermediate arm to receive the end of said bolt member when extended across said hook portion for holding said fishing pole in position, said bolt member, comprising a pair of telescopic sections the inner section of which is pivotally supported on said intermediate arm and the outer section of which is formed with a head, and means for limiting said sections against being separated.

3. In an arm support for a fishing pole, a curved body member adapted to engage transversely across one's arm and having a hook portion at one end for receiving and supporting a fishing pole, and a latch for holding said fishing pole in position in said hook, said hook portion comprising a U-shaped length of wire bent to form a hook and having its arms continuing into said body member, said latch, comprising a bolt member pivotally mounted on the intermediate arm of said U-shaped hook portion and extendable transversely across the open side of said hook portion and over said fishing pole, and a keeper member extended between the side arms of said U-shaped hook portion and opposed to said intermediate arm to receive the end of said bolt member when extended across said hook portion for holding said fishing pole in position, said bolt member, comprising a pair of telescopic sections the inner section of which is pivotally supported on said intermediate arm and the outer section of which is formed with a head, and means for limiting said sections against being separated, comprising pins extending from said inner section and engaging elongated slots formed in opposite sides of said outer section.

4. In an arm support for a fishing pole, a curved body member adapted to engage transversely across one's arm and having a hook portion at one end for receiving and supporting a fishing pole, and a latch for holding said fishing pole in position in said hook, said hook portion comprising a U-shaped length of wire bent to form a hook and having its arms continuing into said body member, said latch, comprising a bolt member pivotally mounted on the intermediate arm of said U-shaped hook portion and extendable transversely across the open side of said hook portion and over said fishing pole, and a keeper member extended between the side arms of said U-shaped hook portion and opposed to said intermediate arm to receive the end of said bolt member when extended across said hook portion for holding said fishing pole in position, said bolt member, comprising a pair of telescopic sections the inner section of which is pivotally supported on said intermediate arm and the outer section of which is formed with a head, and means for limiting said sections against being separated, said keeper member, comprising a strand of wire having its ends curled about said side arms and intermediate of its ends having a loop portion adapted to receive said bolt member with said head extended beyond said loop portion to prevent the sections of said bolt member from telescoping together to disengage said keeper member.

MORTON PLANITZ.